US005676236A

United States Patent [19]

Barnes et al.

[11] Patent Number: 5,676,236

[45] Date of Patent: Oct. 14, 1997

[54] VANE ORIENTER WITH WIPERS

[75] Inventors: Derek Barnes, West Vancouver; Roger Wayne Kozak, Port Coquitlam; Thomas Howard Murphy, Burnaby, all of Canada

[73] Assignee: MacMillan Bloedel Limited, Vancouver, Canada

[21] Appl. No.: 718,074

[22] Filed: Sep. 17, 1996

[51] Int. Cl.$^6$ .................. B65G 47/24

[52] U.S. Cl. .................. 198/382

[58] Field of Search .................. 198/382, 383, 198/390, 392, 533, 387; 425/81.1, 82.1, 83.1, 110

[56] References Cited

U.S. PATENT DOCUMENTS

| | | | |
|---|---|---|---|
| 3,677,390 | 7/1972 | Parker et al. | 198/382 X |
| 4,058,201 | 11/1977 | Etzold | 198/382 |
| 5,325,954 | 7/1994 | Crittenden et al. | 198/382 |
| 5,404,990 | 4/1995 | Barnes et al. | 198/382 |
| 5,487,460 | 1/1996 | Barnes | 198/382 |

FOREIGN PATENT DOCUMENTS

| | | | |
|---|---|---|---|
| 0816285 | 7/1959 | United Kingdom | 198/382 |

*Primary Examiner*—James R. Bidwell
*Attorney, Agent, or Firm*—C. A. Rowley

[57] ABSTRACT

A strand orienter formed by a plurality of substantially planar parallel partition walls further includes a plurality of shafts extending substantially perpendicular to the partition walls, each mounting wipers in the passages in position to wipe strands that may tend to plug the orienter from the passages and off the upper edges of the partition walls over substantially the full length of these upper edges and thereby prevent plugging of the orienter.

4 Claims, 4 Drawing Sheets

VANE ORIENTER WITH WIPERS

FIELD OF INVENTION

The present invention relates to a strand orienter, more particularly, the present invention relates to a vane type orienter incorporating an antiplugging device.

BACKGROUND OF THE INVENTION

Orienters such as the multideck orienter described in U.S. Pat. No. 5,487,460 issued Jan. 30, 1996 to Barnes wherein each passage through an upper deck is bisected into a pair of passages by a partition in the next lower deck have been disclosed. Rotating disks were used in the system to form the upper edge of each of the decks to prevent plugging of the orienter.

U.S. Pat. No. 5,404,990 issued Apr. 11, 1995 to Barnes et al. disclosed a vane type orienter wherein at least the lowest deck in a multideck orienter has vanes positioned between adjacent disks and wherein rotating wipers are positioned adjacent to the vanes to clear the strands from the upper surfaces of the vanes between the disks.

The use of disks requires relatively strong construction since the disks are heavy and there are a large number of them mounted in spaced relationship on each shaft. This construction is relatively expensive and though it operates effectively, increases maintenance cost and requires added capital.

In arrangements where each vertical walls of the orienter are formed by a plurality of disks one above the other, the tops of vertically adjacent partition must be spaced to accommodate the disks and thus, the spacing must be significant leading to a taller orienter.

BRIEF DESCRIPTION OF THE PRESENT INVENTION

It is an object of the present invention to provide a relatively simple vane type orienter that permits less expensive construction yet prevents plugging under normal strand flow conditions.

A vane type orienter comprising at least one orienting deck, a plurality of spaced parallel substantially vertically extending partition walls defining pairs of opposed sides of substantially vertical orienting passages through said at least one deck, each of said orienting passages having a longitudinal axis substantially parallel to said partition walls, a plurality of shafts in each of said at least one orienting deck, means to rotate said shafts, said shafts in each of said at least one orienting deck having their axes extending substantially perpendicular to said partition walls and spaced longitudinally along said passages, a plurality of Wipers connected to each of said shafts and each said wiper is rotatable with its said shaft, the positions of said shafts and top edges of said partitions in said at least one deck and lengths of said wipers being coordinated so that each said wiper rotates with its orienting passage and projects above said top edges of said partitions of its deck to sweep an adjacent portion of said top edges clear of said strands and prevent plugging of said passages.

Preferably said orienter will include a plurality of orienting decks stacked one above the other, each said partition walls defining said passages in an upper deck extending through and defining sides of said passages in said decks position below said upper deck, each said partition walls in a first lower deck immediately below said upper deck dividing one of said passages through said upper deck and immediately thereabove into a pair of said passages and defining sides of said passages in said first lower deck and any of said decks positioned below said first lower deck, each of said shafts in said upper deck being positioned substantially directly above corresponding shafts in at least some of said decks therebelow.

Preferably, said top edges of said partitions are of substantially undulate form wave shapes with alternating crests and troughs as viewed in a direction axially of said shafts and wherein each said crest of each said wave shape of each deck is in substantially vertical alignment with one of said shafts in its deck.

Preferably, each trough of said waves is in substantially vertical alignment with an axis shaft adjacent to said one of said shafts.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
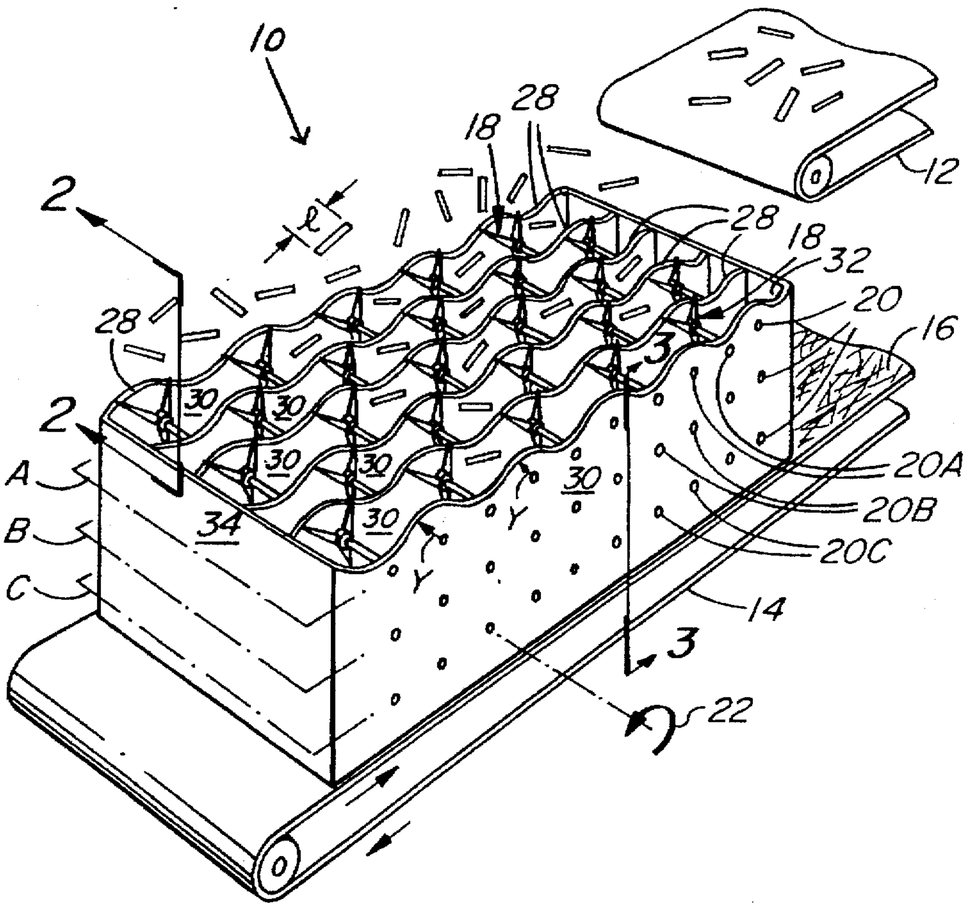
FIG. 1 is a isometric view from the top of an orienter constructed in accordance with the present invention.
Figure 2:
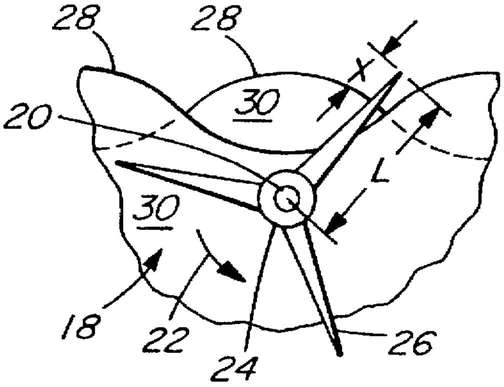
FIG. 2 is a partial side view illustrating a typical wiper and its position and extension relative to the top edges of its adjacent partition walls.

As schematically illustrated in FIGS. 1 and 2, the orienter 10 may be fed by a suitable belt or the like as indicated at 12 which delivers the strands as uniform as possible over the top of the orienter 10. Preferably, a suitable distributor, not shown, may be placed in the flow path of the strands to uniformly distribute same. The oriented strands which are oriented by passing through the orienter 10 are collected as a mat 16 of oriented strands on a belt 14.

The orienter 10 of the present invention illustrated in the FIG. 1 operates in essentially the same manner as the orienter described in U.S. Pat. No. 5,487,460 issued Jan. 30, 1996 to Barnes. However, the construction of the present orienter is simpler in that disks forming the top edges of the partitions may be eliminated and replaced by solid or fixed vanes or partitions defining the sides of orienting passages as illustrated at 36, 38, 40, 42 and 44 (to be described below) and kept clear by wipers 18.

A series of wipers 18 is positioned in the orienting passages 36, 38, 40, 42 and 44 described below, adjacent to the top of each of the partition walls to wipe the top of the partition wall along substantially the full length of the partition wall and ensure the strands pass directly through the orienter without plugging in the orienting passages 36, 38, 40, 42 or 44. Each of the wipers 18 is mounted on and rotated with its respective shaft 20 which are arranged in sets, one set for each deck of the orienter as will be described hereinbelow. These shafts 20 are driven by a suitable drive as indicated schematically by the arrows 22 to rotate on their longitudinal axis and thereby rotate the wipers 18. While a plurality of decks are shown, the wipers 18 may be applied to a single deck orienter to clear the top of the partition and push strands through the orienting passages to prevent plugging.

As shown in FIG. 2, a typical wiper 18 is composed of a hub 24 from which wiper arms 26 project, in the illustrated arrangement substantially radially from the shaft 20. In the illustrated arrangement, three arms 26 are provided on each wiper 18. The number of wiper arms 26 per wiper is not critical, however, it is important that the wipers sweep the top of their adjacent partitions as will be described below, at a frequency sufficient to keep the top edges clear yet at a velocity that is not so fast that the wiper elements or arms 26 impact the strands and damage them. Obviously, to obtain the same number of wipes per second with only a single wiper element or arm 26 per wiper 18, the wiper elements 26 must travel three times as fast as a wiper 18 with three uniformly spaced arms 26 to sweep the upper surface the same number of times.

Another factor determining velocity is the length or radius swept by the wiper element 26 as indicated by the dimension L. Obviously, the longer the wiper element for a given angular velocity of the shaft 20 (wipers per second), the higher its peripheral speed. The length (L) in part determines the dimensions or shape of the upper surfaces 28 of the partition and in the illustrated arrangement, the upper surfaces of the side walls 30 of the orienter 10. Normally, the wiper arm 26 and undulating shape of the upper edge of the partition is determined by the length (l) of the strands to be oriented (see FIG. 1).

In the arrangement illustrated in FIG. 1, the orienter 10 has a front end wall 32 and a rear end wall 34 and the partitions 30 extend therebetween in substantially parallel vertical planes.

Figure 3:
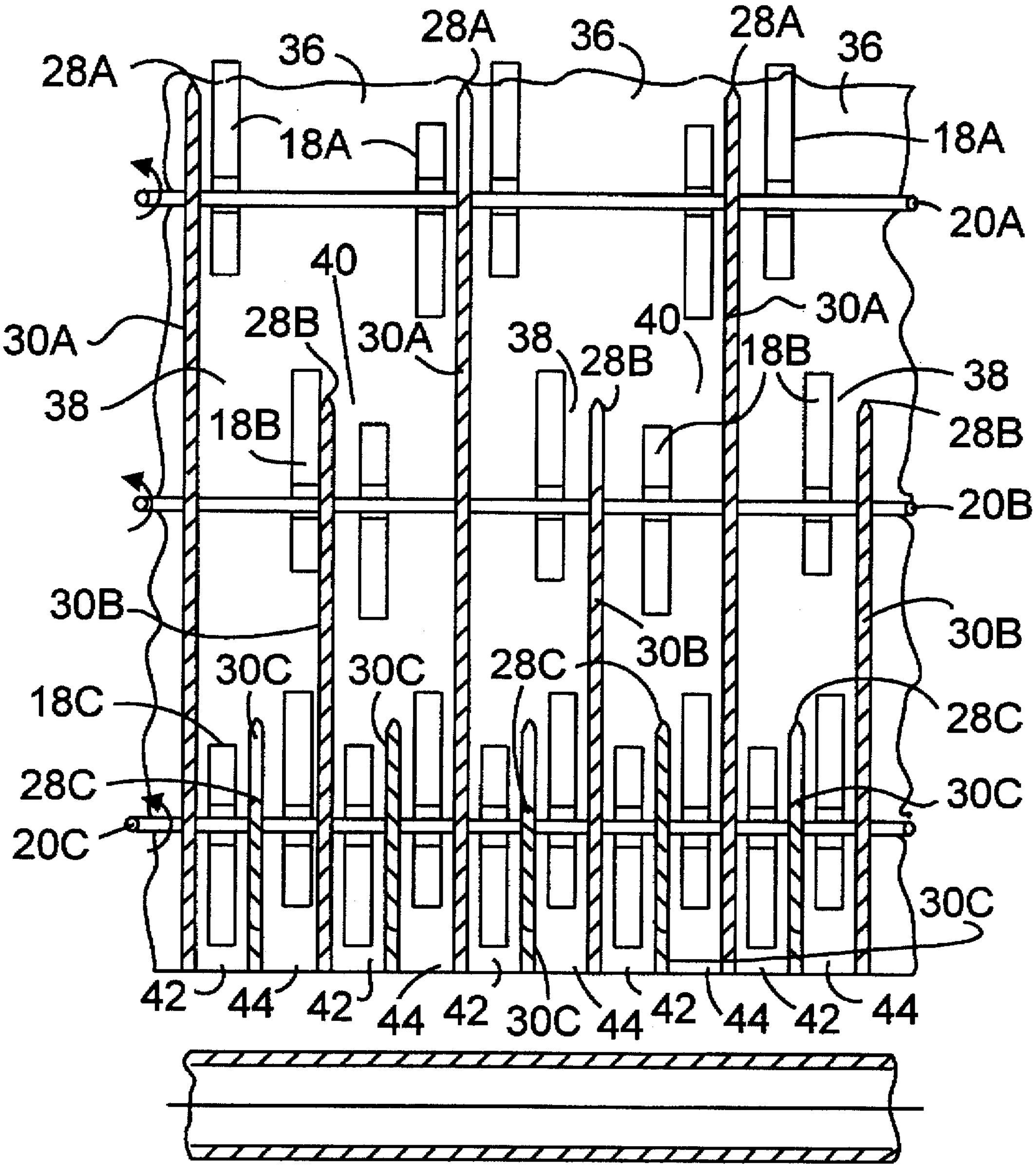
FIG. 3 is a schematic partial cross-section through the orienter along the line 3—3 of FIG. 1.

In FIG. 3, the partitions have been divided into groups or decks that are spaced based on wiper length which in turn is generally based on strand length. In the arrangement shown in FIG. 3, the wipers on an upper shaft do not project into the passages defined in the next lower deck, e.g. the wipers 18B do not project into the passages 42 or 44.

The orienter 10 illustrated in FIG. 3 has three separate decks. The partitions 30B of the intermediate deck are interposed between the partition walls 30A of the upper deck and divide the passages 36 through the upper deck 30A into a pair of passages 38 and 40, preferably equal width passages. The passages 38 and 40 in turn are divided by the next lower deck partitions 30C into pairs of adjacent passages 42 and 44, preferably equal width passages. In this arrangement, the partition walls 30A of an upper deck extend completely through and form walls in each of the decks therebetween, for example, the walls 30A for the top deck extend all the way through the orienter to the bottom of the lowest deck.

The top edges of the partition walls 30A in FIG. 2 have been indicated at 28A, top edges of the partitions 30B at 28B and the top edges of the partitions 30C at 28C and the corresponding wipers of each of these partitions has been designated as 18A, 18B and 18C and are mounted on shafts 20A, 20B and 20C respectively. The wipers 18 are strategically positioned along the length of the partition to wipe substantially the full length of the upper edge 28 of each partition 30.

The upper edges 28 of all of the partitions have an undulating shape formed by uniformly spaced peaks and valleys, for example, preferably substantially sinusoidal in shape when viewed from a direction axially of the shafts 20 as shown in FIGS. 1 and 2. These top edges may be sharpened as illustrated in FIG. 3. The thickness of these partitions is maintained relatively narrow and normally will not exceed about ¼ inch. Wider partitions simply occupy more space are heavier and may, if too wide, interfere with the overlap of strands from adjacent passages 42 and 44 leaving the orienter.

As shown, the shafts 20A, 20B and 20C are arranged in a particular pattern. The shafts 20A are arranged in a substantially horizontal plane A extending substantially perpendicular to the partitions 30 and axially of the passages 36. Similarly, the shafts 20B are arranged in a plane B positioned parallel to and below the plane A of the shafts 20A and the shafts 20C are positioned in a plane C parallel to and below the plane B of the shafts 20B (FIG. 2).

The shafts 20A, 20B and 20C are also arranged in vertical planes, preferably aligned with the apexes of the sinusoidal shapes of the tops 28A of the top partitions 30A, i.e. with the crest and troughs of the undulating or top edges 28 of the partitions 30 so that their wiper elements 26 project above their adjacent edge 28 by a distance X (see FIG. 2). X will generally be in the order of about 2.5 cm (1 inch) above the curvature of the top edge 28, will thus be centered on the axes of the shafts 20 and will have a diameter of at least twice the length (l) of the strands to be oriented, i.e. the distance between adjacent shafts 20 in each plane A, B or C, will be at least twice the nominal length of the strands being processed assuming no overlap of wiper elements 26 on adjacent shafts in the same plane A, B or C.

In the preferred arrangement, the diameter swept by the tip of each wiper arm 26 will be 2(L+X). The radius r of the curvature of the upper edge will be L and L will preferably be equal to the nominal length l of the strands to be oriented. X will generally be about 2 cm.

It will be noted that adjacent partitions 30, particularly the adjacent partitions 30A have the troughs of alternating top edges 28A aligned with the axis of a shaft 20A as are the crest of the top edge 28A of the intermediate partition walls 30A between the alternating top edges. This arrangement is more important for the top of the orienter, i.e. partition 30A than for the lower partitions 30B and 30C since the lower partition are between essentially solid partition walls. The shafts 20A, 20B and 20C are preferably arranged in vertical planes substantially perpendicular to the planes A, B and C and the arrangement of crests and troughs is retained for the tops of all partition walls 30.

As shown in FIG. 2, the spacing between the partitions 30A is widest where they define the side of the passages 36. These wide passages may accommodate more than one wiper 18 positioned within the passage. In the illustrated arrangement, two wipers have been shown in each of the passages 36. As the passages become narrower, the number of wipers per shaft per passage is reduced, i.e. in deck formed by partition 30B, only a single wiper 18B is in each of the passages 38 and 40. The wipers 18B are in effect wiping the same partition 30B between the adjacent passages 38 and 40 and thus, in most cases, only a single wiper need be provided to clear the top edge of the partition, however, it is preferred to have wipers in each of passages 38 and 40 to prevent plugging in the passages.

The position of the wipers to be effective should be reasonably close to the partition edge 28 they are intended to wipe although generally, it has been found that even if the wipers 18 were centered within the passages, they would wipe the passages clean, except possibly for the very wide passages 26 at the top of the orienter wherein it is preferred to keep the wipers within about 2 inches of the partition wall 30A they are intended to wipe.

In practice, the present invention was found to operate satisfactorily ensuring feed of strands through the orienter and was able to maintain a production rate without plugging essentially the same as that attainable using disks as the top edges of the partitions 30 in place of the fixed edges in the present invention.

The specific arrangement of an overlapping path of wipers may be accommodated by proper timing of the wipers or reasonable clearance between the paths of rotation.

It may be possible to reduce the number of shafts and wipers, for example, by extending the wipers to wipe vertically adjacent top edges,. however, it is preferred to maintain the arrangement described above so there is a wiper at each shaft in each passage to both wipe the top edge and clear the passage.

Figure 4:
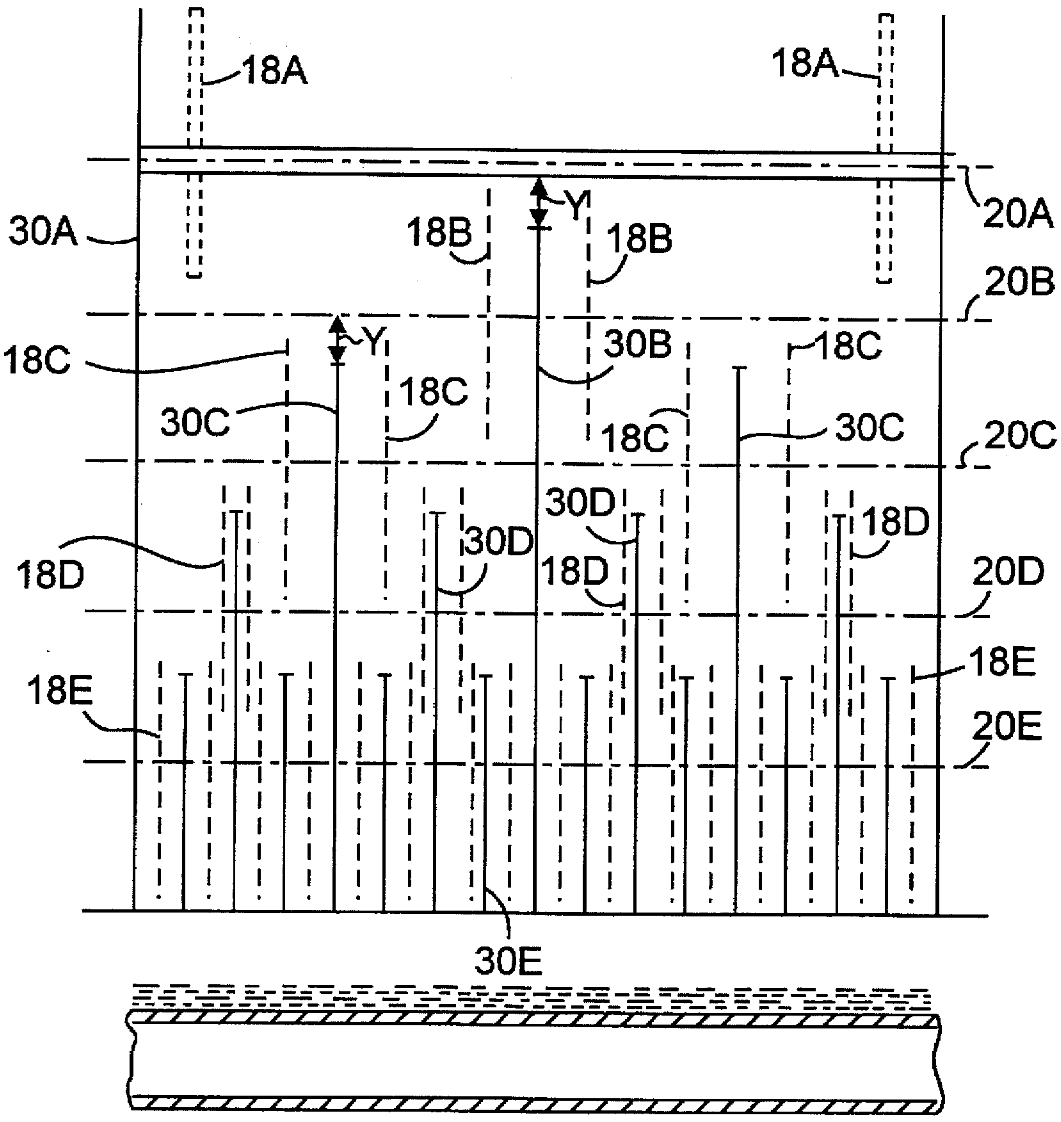
FIG. 4 is a view similar to FIG. 3 showing a shallower former wherein the decks overlap, i.e. the tops of a lower deck is closer to the axes of the shafts of the next higher deck than the arrangement of FIG. 3.

FIG. 4 shows a schematically alternative embodiment of the present invention wherein the spacing between the tops of the partitions have been reduced so that the top of a lower partition approaches more closely the axes of the shaft of the deck immediately thereabove, i.e. the distance Y is shorter in the FIG. 4 embodiment than in the FIG. 3 embodiment so that the overall height of the orienter may be reduced. This is more important where a number of decks are going to be increased, for example, as shown in FIG. 4 there are five decks whereas in FIG. 3, there were only three decks.

It is important that the distance Y not be made too short so that as the width of the passages is decreased, there still remain room for a strand passing through the orienter to pivot around the top of the partition of the deck immediately thereabove and still clear the partition of the deck under consideration.

In FIG. 4, the axes A, B, C, D, and E- indicating axis of the shafts of the different decks have been shown and the dotted lines perpendicular to these axes and crossing these axes represent wipers 18 to clear the passages between their respective partitions.

Figure 5:
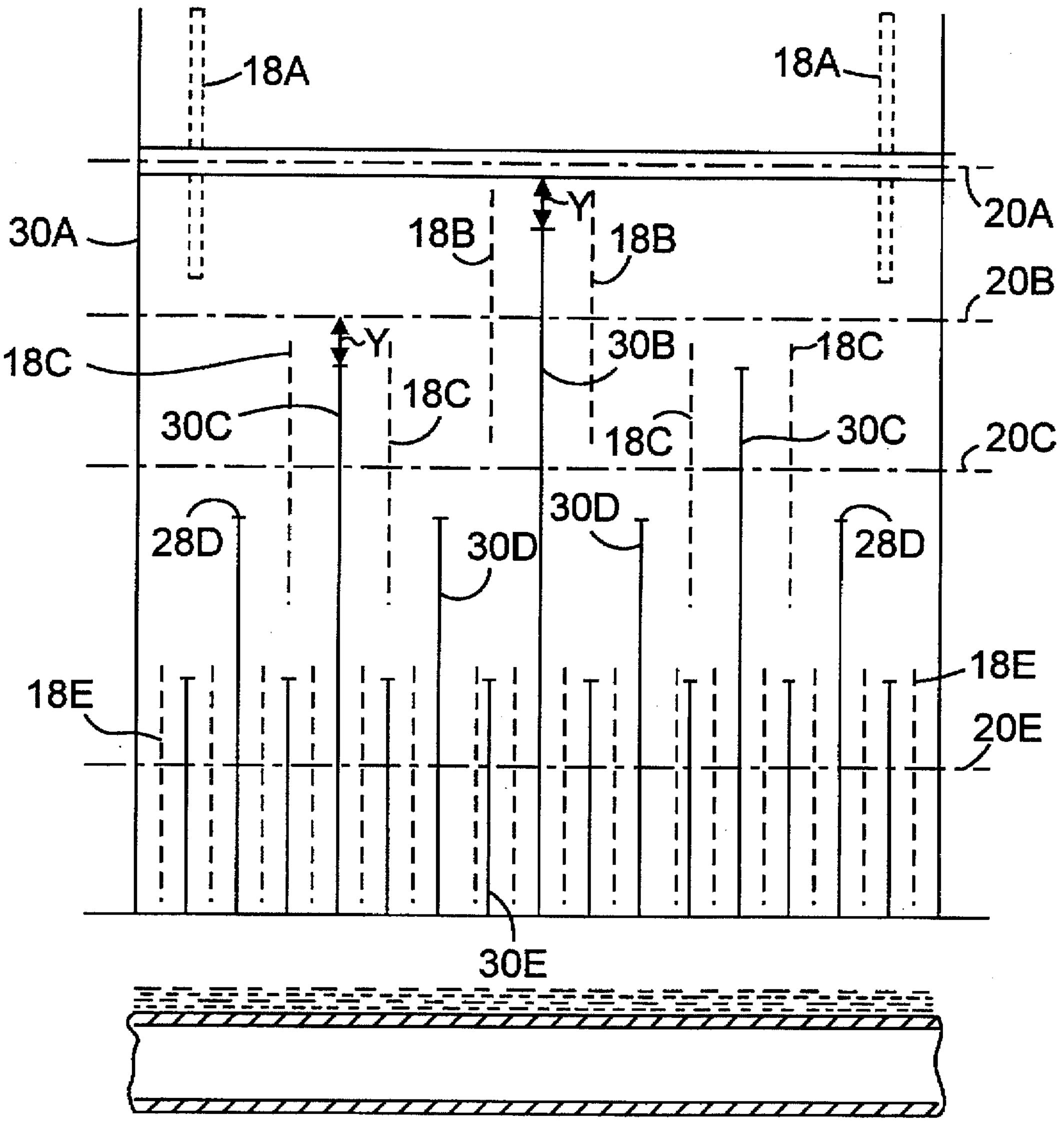
FIG. 5 is a view similar to FIG. 4 showing how the shafts and wipers of an intermediate deck may be eliminated.

FIG. 5 shows the intermediate shafts 20D eliminated. This is possible where there is sufficient overlap of the wipers from the deck immediately thereabove that can wipe clean the upper edges of the deck, i.e. the deck formed by the partitions 30D.

Having described the invention, modifications will be evident to those skilled in the art without departing from the scope of the invention as defined in the appended claims.

We claim:

1. A vane type orienter comprising at least one orienting deck, a plurality of spaced parallel substantially vertically extending partition walls defining pairs of opposed sides of substantially vertical orienting passages through said at least one deck, each of said walls having an undulating fixed top upper edge, each of said orienting passages having a longitudinal axis substantially parallel to said partition walls, a plurality of shafts in each of said at least one orienting deck, said shafts in each of said at least one orienting deck having their axes arranged in a plane extending substantially perpendicular to said partition walls and spaced longitudinally along said passages, a plurality of wipers connected to each of said shafts and each rotatable with its said shaft, the positions of said shafts and said top edges of said partitions in said at least one deck and lengths of said wipers being coordinated so that each said wiper projects above said top edges of said partitions of its deck to sweep adjacent portions of said top edges clear of said strands and said wipers are strategically located axially of said passages to clear their respective passages and to wipe said top edges along substantially their full lengths, and means to rotate said shafts.

2. An orienter defined in claim 1 further comprising a plurality of orienting decks stacked one above the other, each said partition walls defining said passages in an upper deck extending through and defining sides of said passages in said decks positioned below said upper deck, each said partition walls in a first lower deck immediately below said upper deck dividing one of said passages through said upper deck and immediately thereabove into a pair of said passages and defining sides of said passages in said first lower deck and any of said decks positioned below said first lower deck, each of said shafts in said upper deck being positioned substantially directly above corresponding shafts in said decks therebelow.

3. An orienter defined in claim 1 wherein said top edges of said partitions are of substantially sinusoidal shape viewed in a direction axially of said shafts and wherein crests of waves of said sinusoidal shapes of each deck are in substantially vertical alignment with one of said shafts in its deck and troughs of said waves are in substantially vertical alignment with shafts adjacent to said one of said shafts.

4. An orienter defined in claim 2 wherein said top edges of said partitions are of sinusoidal shape viewed in a direction axially of said shafts and when crests of waves of said sinusoidal shapes of each deck are in substantially vertical alignment with one of said shafts if its deck and troughs of said waves are in substantially vertical alignment with shafts adjacent to said one of said shafts.

* * * * *